United States Patent
Bryant et al.

(10) Patent No.: US 6,622,189 B2
(45) Date of Patent: Sep. 16, 2003

(54) METHOD AND SYSTEM FOR LOW OVERHEAD SPIN LOCK INSTRUMENTATION

(75) Inventors: Raymond Morris Bryant, Austin, TX (US); William Henry Hartner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 09/726,274

(22) Filed: Nov. 30, 2000

(65) Prior Publication Data

US 2002/0065968 A1 May 30, 2002

(51) Int. Cl.[7] .............................. G06F 9/46; G06F 13/14
(52) U.S. Cl. ........................................ 710/200; 709/104
(58) Field of Search ............................... 710/200, 240, 710/244, 260, 108; 709/102–104, 229; 711/188, 163; 707/8

(56) References Cited

U.S. PATENT DOCUMENTS

| | | | |
|---|---|---|---|
| 5,850,529 A | * | 12/1998 | Nakamura |
| 5,966,543 A | | 10/1999 | Hartner et al. ............... 395/726 |
| 5,991,845 A | * | 11/1999 | Bohannon et al. |
| 6,105,085 A | * | 8/2000 | Farley |
| 6,480,918 B1 | * | 11/2002 | McKenney et al. |

* cited by examiner

Primary Examiner—Gopal C. Ray
(74) Attorney, Agent, or Firm—Leslie A. Van Leeuwen; Joseph R. Burwell

(57) ABSTRACT

A method and apparatus is presented for controlling spin lock instrumentation for a spin lock in a system with a cache. A lock flag represents a busy state for the spin lock; a first instrumentation flag is a global variable representing an enablement state for the spin lock instrumentation. A second instrumentation flag, stored within the same cache line as the lock flag, is also maintained as an updateable indication of the first instrumentation flag. Prior to each acquirement of the spin lock, the second instrumentation flag is checked for an indication that spin lock instrumentation is enabled. Although a reading of the lock flag may generate a cache miss, the lock flag is necessarily checked upon attempting to acquire the lock; the check of the second instrumentation flag cannot generate a superfluous cache miss because the second instrumentation flag is in the same cache line as the lock flag.

24 Claims, 5 Drawing Sheets

Pseudo-code instruction sequence for acquiring and releasing a spin lock with minimum overhead

```
310 {
  312 — lock:            test_bit 9 of the lock word;                    — 314
                         if (bit 9 is set to 1) {                        — 316
                             call instrumented_lock();                   — 318
                             goto continue;}                             — 320
                         atomic_test_and_set_bit 0 of the lock word;     — 322
                         if (bit 0 was already set) goto spin_loop_entry; — 324
  328 — continue:        <continue with program execution>               — 326
                         .
                         .
                         .
  332 — spin_loop_entry: if (lock_control_state != 0) {                  — 330
                             set_bit 9 of the lock word;                 — 334
                             call instrumented lock();                   — 336
                             goto continue;}                             — 338
  342 — spin_loop:       test_bit 0 of the lock word;                    — 340
                         if (bit 0 of lock word is 1) goto spin_loop;    — 344
                         goto lock;                                      — 346
}

350 {
  354 — unlock:          test_bit 9 of the lock word;                    — 352
                         if (bit 9 is set to 1) {                        — 356
                             call instrumented_unlock();                 — 358
                             goto continue2;}                            — 360
                         atomic_clear_bit 0 of the lock word;            — 362
  366 — continue2:       <continue with program execution>               — 364
}
```

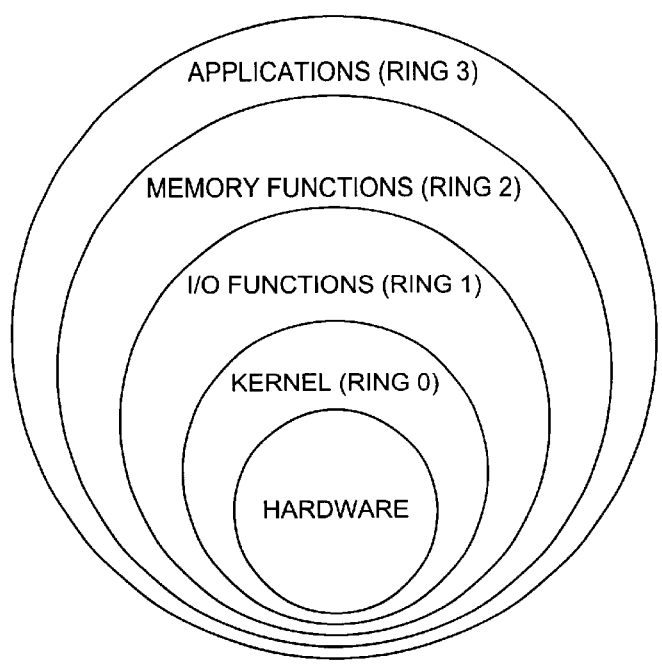
*FIG. 1C*
*(PRIOR ART)*
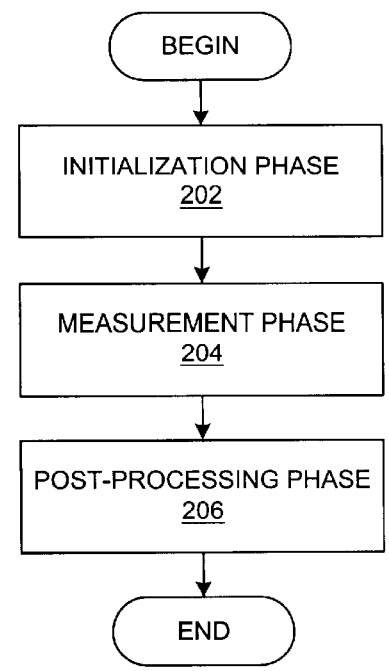
*FIG. 2A*
*(PRIOR ART)*
Pseudo-code instruction sequence for acquiring/setting and releasing a spin lock
```
210 {
    212 — lock:       atomic_test_and_set_bit 0 of the lock word;         — 214
                      if (bit 0 was already set) goto spin_loop;          — 216
    220 — continue:   <continue with program execution>                   — 218
    224 — spin_loop:  test_bit 0 of the lock word;                        — 222
                      if (bit 0 of lock word is set to 1) goto spin_loop; — 226
                      goto lock;                                          — 228
}
230 { 232 — unlock:   atomic_clear_bit 0 of the lock word;                — 234
```
*FIG. 2B*
*(PRIOR ART)*

Pseudo-code instruction sequence for acquiring/setting and releasing an instrumented spin lock

```
         242 — instr1:     check lock_control_state;                        — 244
                           if (spin lock instrumentation is enabled) {     — 246
                               call instrumented_lock();                   — 248
                               goto continue;}                             — 250
         212 — lock:       atomic_test_and_set_bit 0 of the lock word;     — 214
                           if (bit 0 was already set) goto spin_loop;      — 216
240 ⎨    220 — continue:   <continue with program execution>               — 218
              .
              .
              .
         222 — spin_loop:  test_bit 0 of the lock word;                    — 220
                           if (bit 0 of lock word is set to 1) goto spin_loop; — 224
                           goto lock;                                      — 226
              .
              .
              .
         262 — instr2:     check lock_control_state;                       — 264
                           if (spin lock instrumentation is enabled) {     — 266
                               call instrumented_unlock();                 — 268
260 ⎨                          goto continue2;}                            — 270
         232 — unlock:     atomic_clear_bit 0 of the lock word;            — 234
         272 — continue2:  <continue with program execution>               — 274
              .
              .
              .
```

*FIG. 2C*
(PRIOR ART)

Pseudo-code instruction sequence for acquiring and
releasing a spin lock with minimum overhead

```
312 — lock:            test_bit 9 of the lock word;                      — 314
                       if (bit 9 is set to 1) {                          — 316
                           call instrumented_lock();                     — 318
                           goto continue;}                               — 320
                       atomic_test_and_set_bit 0 of the lock word;       — 322
                       if (bit 0 was already set) goto spin_loop_entry;  — 324
328 — continue:        <continue with program execution>                 — 326
       .
310    .
       .
332 — spin_loop_entry: if (lock_control_state != 0) {                    — 330
                           set_bit 9 of the lock word;                   — 334
                           call instrumented lock();                     — 336
                           goto continue;}                               — 338
342 — spin_loop:       test_bit 0 of the lock word;                      — 340
                       if (bit 0 of lock word is 1) goto spin_loop;      — 344
                       goto lock;                                        — 346
       .
       .
       .
354 — unlock:          test_bit 9 of the lock word;                      — 352
                       if (bit 9 is set to 1) {                          — 356
350                        call instrumented_unlock();                   — 358
                           goto continue2;}                              — 360
                       atomic_clear_bit 0 of the lock word;              — 362
366 — continue2:       <continue with program execution>                 — 364
       .
       .
       .
```

FIG. 3

METHOD AND SYSTEM FOR LOW OVERHEAD SPIN LOCK INSTRUMENTATION

BACKGROUND OF THE INVENTION

1. Field of the Invention

The present invention relates to an improved data processing system and, in particular, to a method and apparatus for optimizing performance in a data processing system. Still more particularly, the present invention provides a method and apparatus for monitoring execution of a software program through performance instrumentation.

2. Description of Related Art

Effective management and enhancement of data processing systems requires knowing how and when various system components are operating. In analyzing and enhancing performance of a data processing system and the applications executing within the data processing system, it is helpful to gather information about a data processing system as it is operating.

In order to minimize the undesired effects of instrumentation, the execution of instrumentation code is controlled in some manner. Typically, the performance instrumentation is toggled on or off through the use of one or more globally addressable variables that bracket sections of instrumentation code within the instrumented application. As performance instrumentation code is encountered, the global variable is tested to determine whether or not the instrumentation code should be executed. However, even when the instrumentation is turned off, the overhead of testing a global variable may add unacceptable delay to the performance of the application; the execution of the instructions for testing a global variable not only consumes CPU time but may cause the flushing of the instruction cache or instruction pipeline within the processor. Hence, production software is generally shipped without any installed performance instrumentation, and when a performance problem arises at a later time, a version of the production software that contains performance instrumentation must be built and installed before performance problems can be diagnosed, which is a cumbersome and time-consuming process.

The above issues are particularly important when instrumentation code is inserted into an operating system kernel. In a production environment, such as an on-line transaction processing system accepting orders over the Internet, it can be impossible to introduce a new version of the kernel, i.e. an instrumented version, without considerable testing to make sure that the instrumented version is as reliable as the current production version. This is due to the high cost of a kernel failure in a production environment. Similarly, in a production environment, efficiency of the kernel is extremely important, since the required processing rate of the system may be very high. For both of these reasons, it is advantageous to have the instrumentation installed in the original production kernel in such a way that its effect on performance of the kernel when it is installed, but disabled, is minimal. If the production system is unable to meet its performance goals at some subsequent point in time, then it is an acceptable risk to enable the instrumentation and the associated measurement overhead in order to fix the performance problem so that the system can meet its performance goals.

One type of system that is common in high-performance online transaction processing is a symmetric multiprocessor (SMP) system. An SMP system consists of several processors, each sharing access to a single memory store; data in the shared store is accessed by each of the processors. An SMP system has more processing power than a single processor system for servicing user requests. However, adding additional processors is not without an associated cost: additional synchronization instructions must be executed by the processors in order to make sure that the data shared among the processors is manipulated in a consistent manner.

Performance of an SMP system is generally determined by two factors: instruction path-length and synchronization overhead. Instruction path-length is the number of instructions that the kernel must perform in order to accomplish a particular task. Typically, this is the same on a kernel designed for single processor hardware as it is for SMP hardware with the exception of the additional instructions required for synchronization. Instruction path length can be measured and optimized with instruction counting software, hardware, or other well known tools, such as profilers.

The second factor that can limit the performance of a multiprocessor kernel is synchronization overhead. A common method of SMP synchronization at the software level is for all of the processors to follow a locking protocol when accessing or updating data shared between the processors. Typically, this means that a lock must be acquired before accessing a shared resource, such as a shared data structure, and then released after the access. Contention arises when more than one process in the system tries to acquire a lock at the same time. Correct execution requires that only one of the processes can succeed; the other processes must be delayed until the lock is released.

A delay can be implemented either by "spinning", i.e., executing a tight instruction loop that constantly tries to acquire the lock, or by suspending the task that is attempting to access the shared resource and dispatching that task's processor to run some other task in the system. Locks can thus be classified as either "spin" locks or "suspend" locks depending on how a conflicting-lock access is delayed. Each class of lock has its advantages and disadvantages—acquiring or releasing a spin lock can be very inexpensive but waiting for a lock in a spin loop wastes time that could be devoted to useful work. A task that is suspended while waiting for a lock does not consume processor time, but the cost of acquiring or releasing a suspend lock is much higher than it is for a spin lock. For these reasons, both spin locks and suspend locks are typically present in a multiprocessor operating system kernel.

Spin locks, however, are more primitive and are normally used to implement suspend locks. In either case, excessive contention for a lock can lead to poor system performance, either because too many tasks are suspended, or because too much time is wasted by spinning and waiting for a lock to become available.

Given the complexities of designing and implementing an SMP system, one should be able to instrument various operations of the operating system kernel, and given the importance of spin locks in an SMP system, one might desire to insert instrumentation code into a kernel spin lock in order to gather performance information related to the operation of spin locks. Due to the nature of kernel operations, one would especially desire to minimize the overhead associated with instrumentation code within the kernel, including spin locks.

Therefore, it would be advantageous to provide a method and a system for minimizing overhead effects caused by the execution of instrumentation code associated with kernel spin locks. It would be particularly advantageous to provide an efficient methodology that allows the instrumentation code to be present within a production-quality operating system kernel. Additionally, since only those locks for which contention occurs have a significant impact on performance, it would be advantageous to limit instrumentation so that instrumentation is only enabled for those locks for which contention occurs.

SUMMARY OF THE INVENTION

A method, a system, and a computer program product are presented for (1) controlling operating system kernel spin lock instrumentation for a spin lock in a data processing system that has a cache that results in virtually no overhead when the instrumentation is installed but disabled, (2) restricting enablement of the instrumentation to only those locks for which contention occurs, and (3) dynamically detecting when contention occurs and enabling spin lock instrumentation for locks so detected. A lock flag represents a busy state for the spin lock; a first instrumentation flag is a global variable that represents an enablement state for the spin lock instrumentation. A second instrumentation flag, stored within the same cache line as the lock flag, is also maintained as an updateable indication of the first instrumentation flag. Prior to each acquirement of the spin lock, the second instrumentation flag is checked to see if it indicates that spin lock instrumentation is enabled for this particular spin lock. Although a reading of the lock flag may generate a cache miss, the lock flag is necessarily checked upon attempting to acquire the lock; the check of the second instrumentation flag cannot generate a superfluous cache miss because the second instrumentation flag is in the same cache line as the lock flag. At some point, the second instrumentation flag must be updated to reflect the enablement state that is stored within the first instrumentation flag; the update is delayed until it is determined that the spin lock is in a busy state when a new lock request is made, thereby inducing entry into a spin loop that necessarily wastes execution cycles. Therefore, prior to entering the spin loop, the first instrumentation flag can be read without regard to a cache miss, and the second instrumentation flag is then updated to reflect the value of the first instrumentation flag.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 1C depicts typical software components within a computer system illustrating a logical relationship between the components as functional layers of software;

FIG. 2A is a prior art diagram depicting various processing phases that are typically used to develop instrumentation-derived information;

FIG. 2B depicts a known manner for acquiring and releasing a spin lock through a set of pseudo-code instruction statements;

FIG. 2C depicts a known manner for acquiring and releasing an instrumented spin lock through a set of pseudo-code instruction statements; and FIG. 3 depicts a method for acquiring and releasing an instrumented spin lock through a set of pseudo-code instruction statements in accordance with a preferred embodiment of the present invention.

DETAILED DESCRIPTION OF THE INVENTION

Figure 1A:
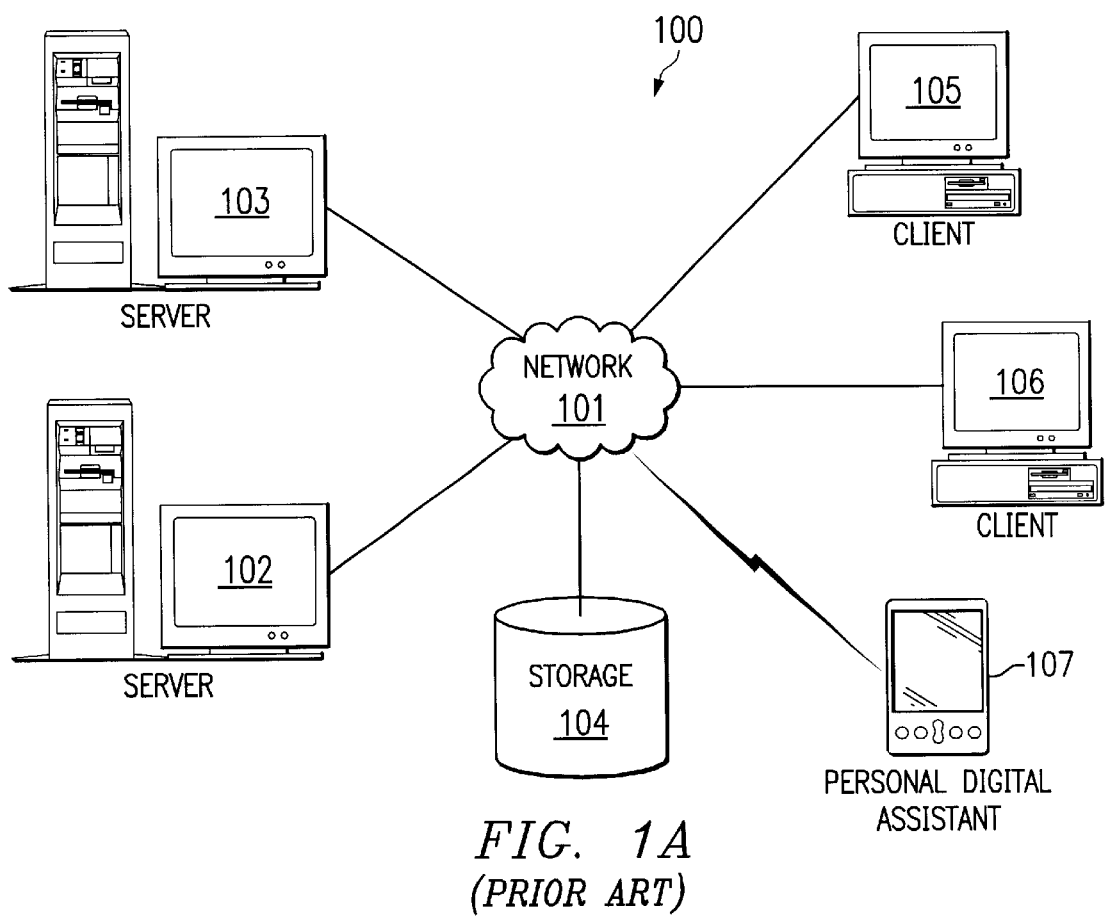
FIG. 1A depicts a typical distributed data processing system in which the present invention may be implemented.

With reference now to the figures, FIG. 1A depicts a typical distributed data processing system in which the present invention may be implemented. Distributed data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 may be a variety of computing devices, such as personal computers, personal digital assistants (PDAs), etc. Distributed data processing system 100 may include additional servers, clients, and other devices not shown. In the depicted example, distributed data processing system 100 may include the Internet with network 101 representing a worldwide collection of networks and gateways that use the TCP/IP suite of protocols to communicate with one another. Of course, distributed data processing system 100 may also be configured to include a number of different types of networks, such as, for example, an intranet, a local area network (LAN), or a wide area network (WAN).

FIG. 1A is intended as an example of a heterogeneous computing environment and not as an architectural limitation for the present invention. The present invention could be implemented on a variety of hardware platforms, such as server 102 or client 107 shown in FIG. 1A. Requests for the collection of instrumentation information may be initiated on a first device within the network, while a second device within the network receives the request, collects the instrumentation information for applications executing on the second device, and returns the collected data to the first device.

Figure 1B:
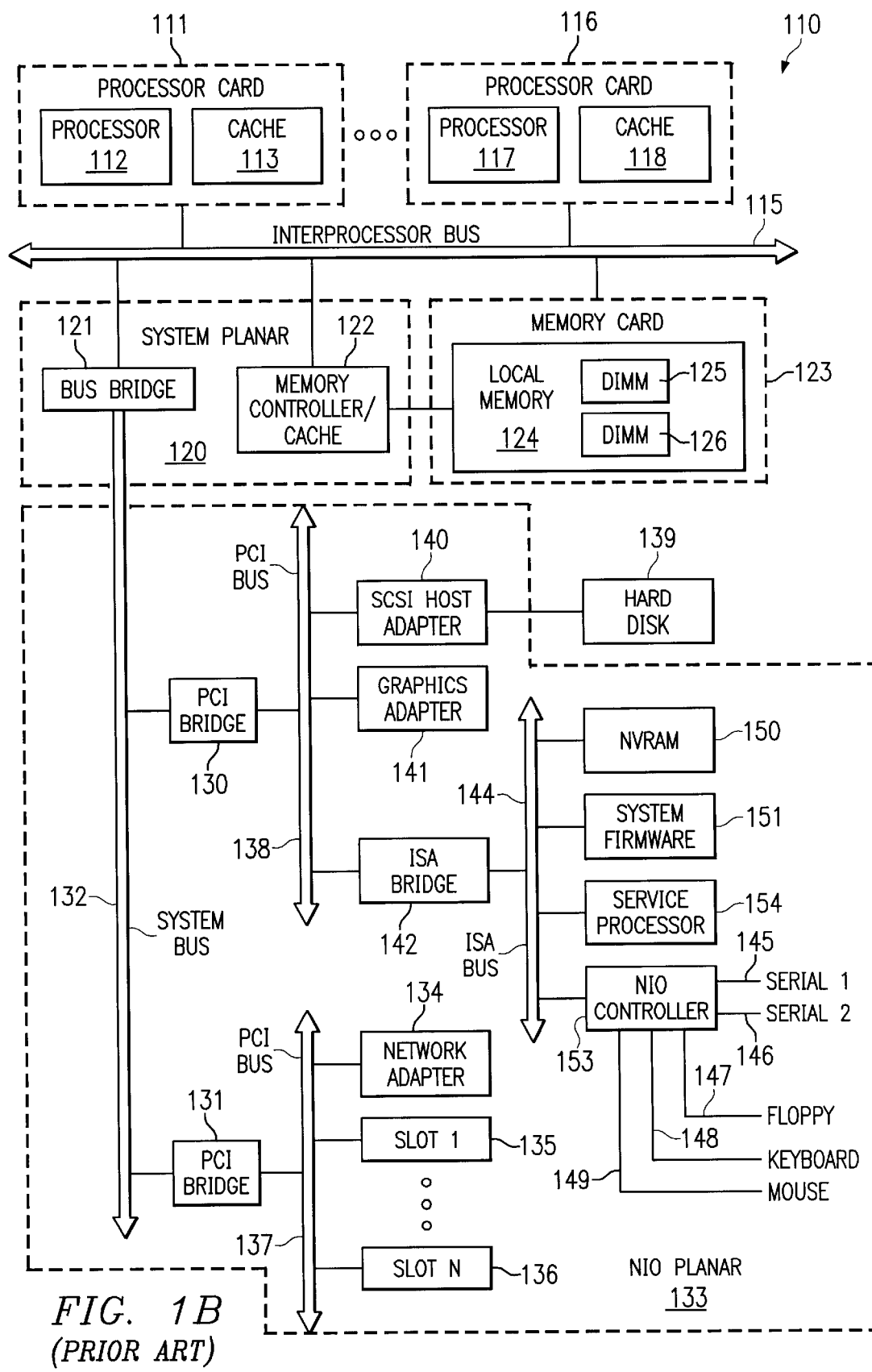
FIG. 1B depicts a typical computer architecture that may be used within a client or server in which the present invention may be implemented.

With reference now to FIG. 1B, a diagram depicts a typical computer architecture that may be used within a client or server, such as those shown in FIG. 1A, in which the present invention may be implemented. Data processing system 110 employs a variety of bus structures and protocols. Processor card 111 contains processor 112 and L2 cache 113 that are connected to interprocessor bus 115. System 110 may contain a plurality of processor cards; processor card 116 contains processor 117 and L2 cache 118.

Interprocessor bus 115 supports system planar 120 that contains bus bridge 121 and memory controller 122 that supports memory card 123. Memory card 123 contains local memory 124 consisting of a plurality of dual in-line memory modules (DIMMs) 125 and 126.

Interprocessor bridge 121 connects to PCI bridges 130 and 131 via system bus 132. PCI bridges 130 and 131 are contained on native I/O (NIO) planar 133 which supports a variety of I/O components and interfaces. PCI bridge 131 provides connections for external data streams through network adapter 134 and a number of card slots 135–136 via PCI bus 137. PCI bridge 130 connects a variety of I/O devices via PCI bus 138. Hard disk 139 may be connected to SCSI host adapter 140, which is connected to PCI bus 138. Graphics adapter 141 may also be connected to PCI bus 138 as depicted, either directly or indirectly.

ISA bridge 142 connects to PCI bridge 130 via PCI bus 138. ISA bridge 142 provides interconnection capabilities through NIO controller 153 via ISA bus 144, such as serial connections 145 and 146. Floppy drive connection 147 provides removable storage. Keyboard connection 148 and mouse connection 149 allow data processing system 110 to accept input data from a user.

Non-volatile RAM (NVRAM) 150 provides non-volatile memory for preserving certain types of data from system disruptions or system failures, such as power supply problems. System firmware 151 is also connected to ISA bus 144 and controls the initial BIOS. Service processor 154 is connected to ISA bus 144 and provides functionality for system diagnostics or system servicing.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted examples are not meant to imply architectural limitations with respect to the present invention. However, it should be understood that the present invention would most commonly be applicable to an SMP system.

In addition to being able to be implemented on a variety of hardware platforms, the present invention may be implemented in a variety of software environments.

With reference now to FIG. 1C, a prior art diagram shows software components within a computer system illustrating a logical relationship between the components as functional layers of software. The kernel (Ring 0) of the operating system provides a core set of functions that acts as an interface to the hardware. I/O functions and drivers can be viewed as resident in Ring 1, while memory management and memory-related functions are resident in Ring 2. User applications and other programs (Ring 3) access the functions in the other layers to perform general data processing. Rings 0–2, as a whole, may be viewed as the operating system of a particular device. Assuming that the operating system is extensible, software drivers may be added to the operating system to support various additional functions required by user applications, such as device drivers for support of new devices added to the system.

The present invention may be implemented on a variety of hardware and software platforms, as described above. More specifically, though, the present invention is directed to a methodology for reducing overhead effects of performance instrumentation when the execution of the instrumentation code is unnecessary, and the methodology allows the performance instrumentation to be present within production-quality software. In particular, the present invention provides (1) a technique for controlling, i.e., enabling and disabling, the instrumentation of kernel spin locks, e.g., the spin locks in the Linux 2.4 kernel, such that the kernel spin lock instrumentation has minimal performance impact when it is installed but disabled and (2) a method of instrumenting only those locks for which there is contention and a dynamic method of detecting those locks during execution of the operating system kernel.

In the prior art, production-quality kernels are generally shipped without any installed instrumentation code due to overhead associated with the execution of instrumentation code, and if a performance problem arises at a later time, a version of the production kernel that contains instrumentation code must be built and installed before performance problems can be diagnosed, which is a cumbersome and time-consuming process. Since the spin lock instrumentation of the present invention has virtually no overhead when it is installed but not enabled, one may ship a production kernel containing the spin lock instrumentation of the present invention and then enable the execution of the spin lock instrumentation code when problems are detected that require spin lock analysis data rather than switching between instrumented and uninstrumented versions of the kernel.

Additionally, in the prior art, instrumentation was typically applied to all of the spin locks in the kernel, with the result that instrumentation overhead was introduced for those locks for which there is no contention. This is unnecessary overhead because such locks cannot be a performance problem in the system. By only instrumenting locks for which there is contention, the current invention provides the same level of information as instrumentation in the prior art at a lower measurement overhead than was possible in the prior art.

First, a typical manner for instrumenting an application or an operating system kernel is described below with respect to FIG. 2A. The known process depicted in FIG. 2A shows the various phases for instrumenting an application and using the instrumented application.

Second, a typical code sequence for acquiring/setting a spin lock in a known manner is then described below with respect to FIG. 2B. It should be noted that the description of the prior art and the description of the present invention refers to spin lock instrumentation within the Linux operating system. However, the Linux operating system is merely used as an example, and the present invention is applicable to spin locks within a variety of operating systems.

Third, a typical code sequence for acquiring an instrumented spin lock in a known manner is described below with respect to FIG. 2C.

Finally, the novel manner in which the present invention provides for acquiring or setting an instrumented spin lock is described with respect to FIG. 3.

With reference now to FIG. 2A, a prior art diagram depicts various processing phases of instrumented code. When the code is compiled, only certain types of syntax errors can be found by the compiler as compile-time errors. However, when the code is executed, the code may experience run-time issues or errors based on the manner in which the code was written and the input data that is processed by the code. Instrumented code is typically used to develop performance information or to resolve run-time issues or errors.

The flowchart in FIG. 2A shows a general process for instrumenting some portion of code, executing the code, and processing the performance information generated during the execution of the instrumented code. Instrumented code is not typically present in production quality kernel because instrumentation changes the size and performance of the code to be analyzed; hence, instrumented code is typically not delivered within a final version of an operating system kernel.

After a kernel has been instrumented, the kernel may be executed. After the code has been "instrumented", then performance monitoring may be performed. An initialization phase 202 may be used to configure the code for capturing the state of a machine or an application at the time that measurement is initiated.

Next, during the measurement phase 204, measurement data is recorded in a kernel buffer set aside for this task at initialization time. In the post-processing phase 206, the collected measurement data is analyzed and made available in a human readable form. By dividing the instrumentation into initialization, measurement, and analysis phases, execution of the measurement phase can be made more efficient, since the intermediate measurement data can be stored in the most efficient manner necessary, and conversion of that data to a human-readable format can be done off-line, i.e., after the measurement experiment has completed.

With reference now to FIG. 2B, a known manner for acquiring and releasing a spin lock is depicted through a set of pseudo-code instruction statements. Some run-time performance issues may involve the use of kernel spin locks. A spin lock is used to guarantee mutually exclusive access to some resource. If a spin lock is not available, the calling thread is not blocked; instead, the calling thread busy waits or "spins" until the lock becomes available. This facility is intended for use when the delay caused by spinning is expected to be smaller than the delay caused by performing a context switch to another thread and back.

This facility is also used as the most basic synchronization primitive in a multiprocessing system. More complicated locking mechanisms, such as those that involve performing a context switch to another thread, are implemented using spin locks as an underlying synchronization primitive. Spin locks are not normally required on a uniprocessor machine; instead, it is sufficient on such machines to disable interrupts for the duration of the basic synchronization operation.

Pseudo-code instruction sequence 210 contains a series of instructions for acquiring a spin lock. The terms "acquiring" and "setting" a spin lock may be considered synonymous because, in this example, a spin lock is acquired by setting a logical flag within the computer, and the spin lock flag is only set when it is acquired. In this example, the flag is implemented as a single bit within a specially designated word or global variable.

After executing some previous instructions, the execution flow reaches an instruction with label 212; in this case, label 212 is "lock". The result of atomic test-and-set-bit instruction 214 is that bit 0 of the spin lock flag is set to "1" and the previous value of the bit is returned such that a logical operation can immediately be performed to check the previous value.

The atomic test-and-set-bit instruction 214 is required to be an instruction that guarantees that only one processor of the multiprocessor complex will be able to set the bit and find that it was previously zero, even if one or more processors attempt to execute the atomic test-and-set-bit operation at the same time. Using the Intel Pentium™ processor "lock" prefix to the test-and-set-bit Intel Pentium™ instruction is one way to implement such an atomic operation. Other implementations of the test-and-set-bit operation are possible; for example, one may use the load_and_reserve_address, store_and_check_reservation sequences of the PowerPC™ processor or similar sequences.

Instruction 216 checks the previous value of the bit; if it was "0", then execution continues at instruction statement 218 at label 220. Since the appropriate bit has been set with instruction 214, the lock has been acquired, and the processing associated with the lock can proceed.

If the previous value of the bit was "1", i.e., it was already set, then the lock is already in use, and the requesting section of code shown in FIG. 2B must wait for the lock to be relinquished. Hence, the execution flow branches to instruction 222 at label 224; in this case, label 224 is "spin_loop".

Instruction 222 tests a bit of the spin lock flag and returns the bit's value. Instruction 226 checks whether or not the bit is "1", which would indicate that the lock is still in use. If so, then execution branches back to instruction 222 at label 224. If the bit is "0", which would indicate that the lock is no longer in use, then instruction 228 causes the execution flow to branch back to instruction 214 at label 212, at which point instruction code sequence 210 can again attempt to acquire the lock.

The spin loop code fragment at label 224 is placed out of the normal code execution path to avoid the requirement of an additional branch around the spin loop code. In the Linux operating system, the locking code is substituted in-line into the program text to avoid requiring the overhead of a subroutine call in order to set the lock. In other words, the code fragment is replicated at each point that a lock is required. Other systems, such as OS/2, use a single subroutine with common locking code for all spin locks in the kernel.

To release a spin lock in a manner that matches the example shown above for acquiring the lock, the Linux system uses code such as that shown in pseudo-code instruction sequence 230. In this example, pseudo-code instruction sequence 230 contains a single instruction statement at label 232; in this case, label 232 is "unlock". Similar to the locking code fragment at label 224, the unlocking code fragment at label 232 is placed out of the normal code execution path to avoid the requirement of an additional branch around the unlock code.

Instruction 234 clears a single bit of the lock word in an atomic operation. For an Intel Pentium™ processor-based machine, a simple "move immediate zero to byte" is sufficient to implement the atomic clear-bit operation. For an Intel 386 processor-based machine, a "locked move immediate zero to byte" is required. Similar implementations exist for other machines.

As noted previously, instrumenting an application to enable tracing may undesirably disturb the execution of the application because, as the instrumented application executes, the instrumentation code may cause significant overhead. In order to reduce the overhead of performance instrumentation, the prior art teaches that the execution of instrumentation code should be limited or controlled in some manner. Typically, the performance instrumentation is toggled on or off through the use of one or more globally addressable variables that bracket sections of instrumentation code within a larger section of instrumented code. As performance instrumentation code is encountered, the global variable is tested to determine whether or not the instrumentation code should be executed.

With reference now to FIG. 2C, a known manner for acquiring and releasing an instrumented spin lock is depicted through a set of pseudo-code instruction statements. Similar reference numbers in FIG. 2B and FIG. 2C correspond to similar elements in the figures. In contrast to FIG. 2B, however, pseudo-code instruction sequence 240 in FIG. 2C contains instructions for obtaining an instrumented spin lock in addition to the previously described series of instructions for acquiring a non-instrumented spin lock. Pseudo-code instruction sequence 260 in FIG. 2C also contains instructions for releasing an instrumented spin lock in addition to the previously described instruction(s) for releasing a non-instrumented spin lock.

A known manner for controlling the state of performance instrumentation is to maintain a global variable that indicates whether or not instrumentation is enabled. If the global variable is non-zero, instrumentation is enabled, and if it is zero, then instrumentation is disabled. In the example shown in FIG. 2C, the global variable is called "lock_control_state". The following examples assume the existence of an instrumented lock routine, which is termed "instrumented_lock( )", and an instrumented unlock routine, which is termed "instrumented_unlock( )". These routines contain the instructions that are necessary to record the desired statistics associated with acquiring and releasing kernel spin locks, which are essentially a type of performance instrumentation data, as well as the instructions for implementing the actual locking and unlocking (acquiring and releasing) of the kernel spin lock. The internal operations of these types of routines are well known in the art, hence these routines are not herein described in further detail.

Prior to acquiring a spin lock, the execution flow reaches instruction 244 with label 242; in this case, label 242 is "instr1". Instruction 244 performs a check on "lock_control_state", and instruction 246 determines whether or not instrumentation is enabled. If it is zero, which indicates that instrumentation is disabled, then execution continues at label 212. At that point, execution continues by acquiring a non-instrumented lock, as described above with respect to FIG. 2B.

If the global variable is non-zero, which indicates that instrumentation is enabled, then execution continues at instruction 248, which calls "instrumented_lock( )". Upon completion of the routine, instruction 250 causes the execution flow to branch to label 220, at which point execution continues with other instructions that rely upon acquiring of the lock.

To release a spin lock in a manner that matches the manner in which the spin lock was acquired, pseudo-code instruction sequence 260 contains instructions for determining whether or not instrumentation is enabled. Prior to releasing a spin lock, the execution flow reaches instruction 264 with label 262; in this case, label 262 is "instr2". Instruction 264 performs a check on "lock_control_state", and instruction 266 determines whether or not instrumentation is enabled. If it is zero, which indicates that instrumentation is disabled, then execution continues at label 232. At that point, execution continues by releasing a non-instrumented lock, as described above with respect to FIG. 2B.

If the global variable is non-zero, which indicates that instrumentation is enabled, then execution continues at instruction 268, which calls "instrumented_unlock( )". Upon completion of the routine, instruction 270 causes the execution flow to branch to instruction statement 274 at label 272, at which point normal program execution continues.

It should be noted that instrumentation may be controlled by one or more global variables; in other words, a single global variable may be used for controlling all instrumentation, or each type of instrumentation may have its own global variable. In the examples described above, a specially dedicated global variable is employed to control all spin lock instrumentation. Alternatively, each lock may have its own global variable.

Instead of using one or more global variables, the present invention introduces a novel approach for minimizing the overhead effects of enabling and disabling performance instrumentation code associated with spin locks. The present invention is able to implement low overhead lock instrumentation as a result of an observation that execution time for modern RISC (Reduced Instruction Set Computer) or CISC (Complex Instruction Set Computer) microprocessors with clock speeds in the 500 MHz and above range depends more on the number of cache misses by the microprocessor rather than the number of instructions executed by the microprocessor.

Once a cache line has been fetched into the processor's L1 cache, the processor can execute a number of instructions almost for free compared to the overhead associated with fetching another cache line. This fact is exploited when there is contention for a lock. The time that is spent spinning in the spin loop, such as that shown in FIG. 2B or FIG. 2C, can be effectively exploited to do instrumentation work at no additional overhead to the executing program. In contrast, checking a global variable, such as "lock control state" in FIG. 2B or FIG. 2C, requires an additional cache access that adds unacceptable overhead if the check is performed as part of each lock request.

In addition, as is well known in the prior art, branches within the execution flow of an application can decrease performance by consuming hardware resources for branch prediction at execution time and by restricting instruction scheduling freedom during compilation. Hence, one also desires to postpone any branching operations until necessary.

For the purposes of this invention, one can assume that bit 0 of the lock word is used to contain the lock state, and one can also assume that bit 9, i.e., the lowest order bit of the next byte of the lock word, is used to record whether instrumentation is enabled for this particular lock. The choice of bit 9 is guided by the operational characteristics of an Intel Pentium™ processor in which the unlock instruction is typically implemented as a "move immediate zero to byte" instruction; if the instrumentation-enabling bit were stored in the same byte as the lock bit, then the value of the instrumentation bit would be lost each time that the lock was released. This potential problem is avoided by choosing a bit in some other byte of the lock word. For other processor architectures, some other bit of the lock word may be chosen that is dependent on the lock and unlock implementation on that particular architecture.

With reference now to FIG. 3, a method for acquiring and releasing an instrumented spin lock is depicted through a set of pseudo-code instruction statements in accordance with a preferred embodiment of the present invention. In a manner similar to that described above with respect to other figures, a global variable called "lock_control_state" in FIG. 3 holds the flag for controlling spin lock instrumentation. Again, the example shown in FIG. 3 assumes the existence of an instrumented lock routine, termed "instrumented_lock( )", and an instrumented unlock routine, termed "instrumented_unlock( )". These routines contain the instructions that are necessary to record the desired statistics associated with acquiring and releasing kernel spin locks as well as the instructions for acquiring and releasing the kernel spin lock.

Pseudo-code instruction sequence 310 contains a series of instructions for acquiring a spin lock. After executing some previous instructions, the execution flow reaches the instruction at label 312; in this case, label 312 is "lock". Instruction 314 performs a test of bit 9 of the lock word to check whether or not bit 9 (the bit of the lock word that corresponds to instrumentation enablement) has been set. Instruction 316 determines whether or not bit 9 was set by checking the condition generated by the test operation. If bit 9 of the lock word was set to one, which indicates that "lock_control_state" has already been checked and lock instrumentation is enabled, then execution continues at instruction 318, which calls "instrumented_lock( )". Upon completion of the routine, instruction 320 causes the execution flow to branch to label 328, at which point execution continues with other instructions that rely upon the lock acquired within the "instrumented_lock( )" routine.

If bit 9 of the lock word is zero at instruction 316, either lock instrumentation is disabled or "lock control state" has not yet been checked, as described in more detail further below, and execution continues at instruction 322. At that point, execution continues by attempting to acquire a non-instrumented lock. The result of atomic test-and-set-bit instruction 322 is that bit 0 of the lock word is set to "1" and the previous value of the bit is returned such that a logical operation can immediately be performed to check the previous value. Instruction 324 checks the previous value of the bit; if it was "0", then execution continues at instruction statement 326 at label 328. At that point, since the appropriate bit has been set with instruction 322, the lock has been acquired, and the processing associated with the lock can proceed.

If the previous value of bit 0 of the lock word was "1" at instruction 324, i.e., it was already set, then the lock is already in use, and this section of code must wait for the lock to be relinquished. Hence, the execution flow branches to instruction 330 at label 332; in this case, label 332 is "spin_loop_entry".

At this point, the execution flow is about to enter the spin loop. Since this section of code must wait for the lock to be released, it does not matter whether or not this section of code incurs any overhead associated with checking a global variable. The main operation within this section of code is to spin in an execution loop while waiting for the release of the lock, so any performance penalty associated with fetching another cache line while checking a global variable is immaterial.

Instruction 330 performs a check on global variable "lock_control_state" to determine whether or not instrumentation is enabled. The check of the global variable may or may not induce a cache miss, but if it does, the delay associated with the cache miss is immaterial as it is known that the lock was busy during the check at instruction 322. If the global variable is non-zero, which indicates that instrumentation is enabled, then execution continues at instruction 334, which sets bit 9 of the lock word to correspond to the enabled instrumentation state of the global variable "lock_control_state". In this manner, a check of the global variable is delayed until the execution flow is about to enter the spin loop, and the state of the global variable is then reflected in the lock word so that subsequent checks can be made efficiently by accessing the lock word, which is obviously also necessary for determining the state of the lock and will not cause an unnecessary cache miss. Instruction 336 then calls the "instrumented_lock( )" routine. Upon completion of the routine, instruction 338 causes the execution flow to branch to label 328, at which point execution continues with other instructions that rely upon acquiring of the lock.

If the global variable is zero, which indicates that instrumentation is disabled, then execution continues at instruction 340. At this point, execution is continuing by waiting for the release of the lock so that an attempt can be made to acquire the lock along a non-instrumented execution path. Instruction 340 tests bit 0 of the lock word and returns the bit's value. Instruction 344 checks whether or not the bit is "1", which would indicate that the lock is still in use. If so, then execution branches back to instruction 340 at label 342; in this case, label 342 is "spin_loop". If the bit is "0", which would indicate that the lock is no longer in use, then instruction 346 causes the execution flow to branch back to instruction 314 at label 312, at which point instruction code sequence 310 can again attempt to acquire the lock. If bit 9 of the lock word has been set by instruction 334, then on the second and subsequent passes through instruction 314, an attempt to obtain a lock along an instrumented path will immediately fall along the execution path through instructions 316–320. Again, it should be noted that the spin loop code fragment at label 332 is placed out of the normal code execution path to avoid the requirement of an additional branch around the spin loop code.

To release a spin lock in a manner that matches the manner in which the spin lock was acquired, pseudo-code instruction sequence 350 contains instructions for determining whether or not instrumentation is enabled. Prior to releasing a spin lock, the execution flow reaches instruction 352 with label 354; in this case, label 354 is "unlock". Instruction 352 performs a test of bit 9 of the lock word to check whether or not bit 9 (the bit of the lock word that corresponds to instrumentation enablement) has been set. Instruction 356 determines whether or not bit 9 was set by checking the condition generated by the test operation. If bit 9 of the lock word was set to one, which indicates lock instrumentation is enabled, then execution continues at instruction 358, which calls the "instrumented_unlock( )" routine. Upon completion of the routine, instruction 360 causes the execution flow to branch to instruction statement 364 at label 366, at which point normal program execution continues.

If bit 9 of the lock word is zero at instruction 356, lock instrumentation is disabled, and execution continues at instruction 362. At that point, execution is continuing by releasing the lock along a non-instrumented execution path. Instruction 362 clears bit 0 of the lock word to release the lock, and normal program execution may continue at instruction statement 364. Alternatively, instruction statement 364 may contain a branch instruction to return execution flow elsewhere within the executing program. Similar to the spin loop code fragment at label 332, the unlock code fragment at label 354 is placed out of the normal code execution path to avoid the requirement of an additional branch around the unlock code.

As noted previously, it is assumed that the "instrumented_lock( )" routine and the "instrumented_unlock( )" routine contain the instructions that are necessary to record the desired statistics associated with acquiring and releasing spin locks as well as the instructions for implementing the actual locking and unlocking (acquiring and releasing) of the spin lock.

In the example shown in FIG. 3, it would also be assumed that the instrumented lock and unlock routines will clear bit 9 of the lock word if one of these routines detects that lock instrumentation has been disabled. In other words, it may be assumed that the lock instrumentation state can be dynamically modified while the instrumented kernel is executing. For example, this may occur in response to a user command selection in a ring 3 application, which then makes a permissible call to an appropriate ring 0 routine that can reset the "lock_control_state" global variable. The instrumented lock and unlock routines may check the state of the global variable at some point within the execution of the routine, such as upon entering the routine or prior to exiting the routine. If instrumentation has been disabled, then the routine is responsible for resetting the appropriate bit in the lock word to prevent the instrumented routines from being called unnecessarily.

It should be noted that, when instrumentation is enabled, i.e. "lock_control_state" is non-zero, instrumentation code will be executed only for those locks that experience lock contention, i.e., only those locks for which spinning for the lock occurs. If there is no contention for a lock, statistics are not recorded because instrumentation code is not executed. However, since non-contentious locks are not execution bottlenecks in the system, these locks can be ignored for instrumentation purposes.

The advantages of the present invention should be apparent in view of the detailed description of the present invention that is provided above. The overhead of the instrumented locks is minimal when the instrumentation is present within the executable code yet disabled. The flag that controls the lock instrumentation is contained in the same word as the lock itself, and therefore, the lock word and the instrumentation flag are stored in the same cache line. Since the cache line must be pulled into the processor to execute the atomic test-and-set-bit instruction, no additional cache line references are introduced by the lock instrumentation in the case in which the lock is available and the instrumentation is present but disabled. The overhead of the additional instructions to test a lock word bit representing instrumentation enablement (e.g., bit 9 of the lock word) is trivial when compared to the overhead of fetching the cache line containing the lock word.

If the lock is not available, then instructions will be wasted in the spin loop in any case, even in the case of the non-instrumented lock. The overhead of fetching the global variable representing instrumentation enablement (e.g., "lock_control_state") is "hidden" within the instruction and cache cycles that would normally be wasted anyway.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for controlling spin lock instrumentation for a spin lock in a data processing system comprising a cache consisting of cache lines, the method comprising:

reserving a lock flag for the spin lock that represents a busy state for the spin lock;

associating a first instrumentation flag with spin lock instrumentation that represents an enablement state for spin lock instrumentation;

prior to each acquirement of the spin lock, determining whether or not a second instrumentation flag indicates that spin lock instrumentation is enabled, wherein the second instrumentation flag is an updateable indication of the first instrumentation flag, and wherein the second instrumentation flag is stored within a same cache line containing the lock flag;

determining whether or not the lock flag indicates that the spin lock is in a busy state;

in response to a determination that the lock flag indicates that the spin lock is in a busy state, determining whether or not the first instrumentation flag indicates that spin lock instrumentation is enabled; and in response to a determination that the first instrumentation flag indicates that spin lock instrumentation is enabled, updating the second instrumentation flag to indicate that spin lock instrumentation is enabled.

2. The method of claim 1 further comprising, subsequent to the step of determining whether or not the second instrumentation flag indicates that spin lock instrumentation is enabled:

in response to a determination that the second instrumentation flag indicates that spin lock instrumentation is disabled, acquiring the spin lock without executing instrumentation code; and in response to a determination that the second instrumentation flag indicates that spin lock instrumentation is enabled, executing instrumentation code associated with acquiring the spin lock prior to acquiring the spin lock.

3. The method of claim 1 further comprising, subsequent to the step of updating the second instrumentation flag to indicate that spin lock instrumentation is enabled:

executing instrumentation code associated with acquiring the spin lock prior to acquiring the spin lock.

4. The method of claim 1, wherein the step of updating the second instrumentation flag further comprises:

storing the second instrumentation flag and the lock flag in the same word of a cache line.

5. The method of claim 1 further comprising:

prior to each release of the spin lock, determining whether or not the second instrumentation flag indicates that spin lock instrumentation is enabled;

in response to a determination that the second instrumentation flag indicates that spin lock instrumentation is disabled, releasing the spin lock without executing instrumentation code; and in response to a determination that the second instrumentation flag indicates that spin lock instrumentation is enabled, executing instrumentation code associated with releasing the spin lock prior to releasing the spin lock.

6. The method of claim 1 wherein a user may select a state of the first instrumentation flag to control enablement for the spin lock instrumentation.

7. The method of claim 1 further comprising:

setting or clearing the first instrumentation flag while the spin lock is in a busy state.

8. An apparatus comprising:

a processor comprising a cache consisting of cache lines;

a lock flag for a spin lock that represents a busy state for the spin lock;

a first instrumentation flag that represents an enablement state for spin lock instrumentation;

first determining means for determining, prior to each acquirement of the spin lock, whether or not a second instrumentation flag indicates that spin lock instrumentation is enabled, wherein the second instrumentation flag is an updateable indication of the first instrumentation flag, and wherein the second instrumentation flag is stored within a same cache line containing the lock flag;

second determining means for determining whether or not the lock flag indicates that the spin lock is in a busy state;

third determining means for determining, in response to a determination that the lock flag indicates that the spin lock is in a busy state, whether or not the first instrumentation flag indicates that spin lock instrumentation is enabled; and updating means for updating, in response to a determination that the first instrumentation flag indicates that spin lock instrumentation is enabled, the second instrumentation flag to indicate that spin lock instrumentation is enabled.

9. The apparatus of claim 8 further comprising:

acquiring means for acquiring, in response to a determination that the second instrumentation flag indicates that spin lock instrumentation is disabled, the spin lock without executing instrumentation code; and first executing means for executing, in response to a determination that the second instrumentation flag indicates that spin lock instrumentation is enabled, instrumentation code associated with acquiring the spin lock prior to acquiring the spin lock.

10. The apparatus of claim 8 further comprising:

second executing means for executing instrumentation code associated with acquiring the spin lock prior to acquiring the spin lock.

11. The apparatus of claim 8, wherein the updating means for updating the second instrumentation flag further comprises:

storing means for storing the second instrumentation flag and the lock flag in the same word of a cache line.

12. The apparatus of claim 8 further comprising:

fourth determining means for determining, prior to each release of the spin lock, whether or not the second instrumentation flag indicates that spin lock instrumentation is enabled;

releasing means for releasing, in response to a determination that the second instrumentation flag indicates that spin lock instrumentation is disabled, the spin lock without executing instrumentation code; and third executing means for executing, in response to a determination that the second instrumentation flag indicates that spin lock instrumentation is enabled, instrumentation code associated with releasing the spin lock prior to releasing the spin lock.

13. The apparatus of claim 8 wherein a user may select a state of the first instrumentation flag to control enablement for the spin lock instrumentation.

14. A computer program product in a computer readable medium for use in a data processing system comprising a cache consisting of cache lines, the computer program product comprising:

instructions for reserving a lock flag for the spin lock that represents a busy state for the spin lock;

instructions for controlling a first instrumentation flag that represents an enablement state for spin lock instrumentation;

instructions for determining, prior to each acquirement of the spin lock, whether or not a second instrumentation flag indicates that spin lock instrumentation is enabled, wherein the second instrumentation flag is an updateable indication of the first instrumentation flag, and wherein the second instrumentation flag is stored within a same cache line containing the lock flag;

instructions for determining whether or not the lock flag indicates that the spin lock is in a busy state;

instructions for determining, in response to a determination that the lock flag indicates that the spin lock is in a busy state, whether or not the first instrumentation flag indicates that spin lock instrumentation is enabled; and instructions for updating, in response to a determination that the first instrumentation flag indicates that spin lock instrumentation is enabled, the second instrumentation flag to indicate that spin lock instrumentation is enabled.

15. The computer program product of claim 14 further comprising:

instructions for acquiring, in response to a determination that the second instrumentation flag indicates that spin lock instrumentation is disabled, the spin lock without executing instrumentation code; and instructions for executing, in response to a determination that the second instrumentation flag indicates that spin lock instrumentation is enabled, instrumentation code associated with acquiring the spin lock prior to acquiring the spin lock.

16. The computer program product of claim 14, further comprising:

instructions for executing instrumentation code associated with acquiring the spin lock prior to acquiring the spin lock.

17. The computer program product of claim 14, wherein the instructions for updating the second instrumentation flag further comprises:

instructions for storing the second instrumentation flag and the lock flag in the same word of a cache line.

18. The computer program product of claim 14 further comprising:

instructions for determining, prior to each release of the spin lock, whether or not the second instrumentation flag indicates that spin lock instrumentation is enabled;

instructions for releasing, in response to a determination that the second instrumentation flag indicates that spin lock instrumentation is disabled, the spin lock without executing instrumentation code; and instructions for executing, in response to a determination that the second instrumentation flag indicates that spin lock instrumentation is enabled, instrumentation code associated with releasing the spin lock prior to releasing the spin lock.

19. The computer program product of claim 14 further comprising instructions for allowing a user to select a state of the first instrumentation flag to control enablement for the spin lock instrumentation.

20. The computer program product of claim 14 further comprising:

instructions for setting or clearing the first instrumentation flag while the spin lock is in a busy state.

21. A method for controlling spin lock instrumentation for a spin lock in a data processing system comprising a cache, wherein the spin lock instrumentation is embedded within program code that is executed by a processor in the data processing system, the method comprising:

reading spin lock data from the cache into the processor while attempting to acquire the spin lock during execution of the program code; and determining whether or not the spin lock instrumentation is enabled without an additional cache operation.

22. An apparatus comprising:

a processor comprising a cache consisting of cache lines;

program code that is executed by the processor, wherein the program code has embedded spin lock instrumentation;

reading means for reading spin lock data from the cache into the processor while attempting to acquire a spin lock during execution of the program code; and determining means for determining whether or not the spin lock instrumentation is enabled without an additional cache operation.

23. A method for controlling spin lock instrumentation for a spin lock in a data processing system, wherein the spin lock instrumentation is embedded within program code that is executed by a processor in the data processing system, the method comprising:

determining whether or not there is contention for the spin lock within the data processing system;

in response to a determination that there is no contention for the spin lock, acquiring the spin lock without executing the spin lock instrumentation; and in response to a determination that there is contention for the spin lock, acquiring the spin lock with execution of the spin lock instrumentation.

24. An apparatus comprising:

program code that is executed by a processor in a data processing system, wherein the program code has embedded spin lock instrumentation;

determining means for determining whether or not there is contention for the spin lock within the data processing system;

first acquiring means for acquiring, in response to a determination that there is no contention for the spin lock, the spin lock without executing the spin lock instrumentation; and second acquiring means for acquiring, in response to a determination that there is contention for the spin lock, the spin lock with execution of the spin lock instrumentation.

* * * * *